US006796222B2

(12) United States Patent
Cornfield

(10) Patent No.: US 6,796,222 B2
(45) Date of Patent: Sep. 28, 2004

(54) COOKING APPLIANCE WITH INTERCONNECTING RACKS

(76) Inventor: Randall Cornfield, 5499 Robert Burns #306, Montreal, Quebec (CA), H4W-2B4

( * ) Notice: Subject to any disclaimer, the term of this patent is extended or adjusted under 35 U.S.C. 154(b) by 0 days.

(21) Appl. No.: 10/150,720

(22) Filed: May 17, 2002

(65) Prior Publication Data

US 2003/0213375 A1 Nov. 20, 2003

(51) Int. Cl.[7] .................. A47J 27/00; A47J 29/00; A47J 37/00
(52) U.S. Cl. .............. 99/448; 99/339; 99/340; 99/450
(58) Field of Search .................. 99/448, 339, 340, 99/450, 449, 426, 416; 220/912

(56) References Cited

U.S. PATENT DOCUMENTS

| 424,875 | A | * | 4/1890 | Fowler | 99/426 |
|---|---|---|---|---|---|
| 566,226 | A | | 8/1896 | Reutlinger | |
| 747,700 | A | * | 12/1903 | Grimm | 99/449 |
| 979,388 | A | * | 12/1910 | Ericson | 99/449 |
| 1,630,787 | A | | 9/1927 | Cullen | |
| 2,675,458 | A | | 4/1954 | Stiles | |
| 3,427,957 | A | | 2/1969 | O'Reilly | |
| 3,812,840 | A | | 5/1974 | Whaler | |
| 3,847,068 | A | | 11/1974 | Beer et al. | |
| 4,320,736 | A | | 3/1982 | Sharon | |
| D263,670 | S | | 4/1982 | Schawalder | |
| 4,384,513 | A | | 5/1983 | Pierick | |
| 4,446,776 | A | | 5/1984 | Gelfman | |
| 4,528,975 | A | | 7/1985 | Wang | |
| 4,729,297 | A | | 3/1988 | Iranzadi | |
| 4,976,252 | A | | 12/1990 | Cianciola | |
| 5,033,369 | A | | 7/1991 | Wu | |
| 5,067,396 | A | | 11/1991 | Sorensen et al. | |
| 5,365,833 | A | | 11/1994 | Chen | |
| 5,438,916 | A | * | 8/1995 | Dornbush et al. | 99/448 |
| 5,458,054 | A | | 10/1995 | Yu | |
| 5,673,611 | A | * | 10/1997 | Tieman | 99/413 |
| 5,682,811 | A | | 11/1997 | Kidushim | |
| 5,682,873 | A | | 11/1997 | Chambers | |
| 5,727,449 | A | | 3/1998 | Healy et al. | |
| 5,934,185 | A | * | 8/1999 | Sonnier | 99/440 |
| 5,967,135 | A | | 10/1999 | Shariat | |
| 6,035,766 | A | | 3/2000 | Schirmer | |
| 6,125,738 | A | | 10/2000 | Poister | |
| 6,196,115 | B1 | | 3/2001 | Tsao | |
| 6,201,217 | B1 | | 3/2001 | Moon et al. | |
| 6,263,784 | B1 | | 7/2001 | Wodeslavsky | |
| 6,289,795 | B1 | | 9/2001 | McLemore et al. | |
| 6,360,654 | B1 | | 3/2002 | Cornfield | |
| 6,443,053 | B1 | * | 9/2002 | Rossi | 99/340 |

FOREIGN PATENT DOCUMENTS

| DE | 75 23 324 U1 | 12/1975 |
|---|---|---|
| DE | 86 02 068 U1 | 5/1986 |
| DE | 89 07 269 U1 | 1/1990 |

* cited by examiner

*Primary Examiner*—Reginald L. Alexaner

(57) ABSTRACT

A cooking appliance has a vessel, a top and first and second racks each having a food item support surface. The first rack has a rack support suitable to support the second rack on top of the first rack in nested relation with the food item support surface of the second rack spaced a predetermined distance above the food item support surface of the first rack. The first rack includes a plurality of attachment clips to interconnect the two racks. The racks are interconnected by stacking the racks in a vertical stack and rotating the racks relative to one another for handling the racks as one unit. When interconnected, relative rotation of the racks is prevented. One rack includes a rectangular utensil receiving opening in a bottom surface sized and shaped to receive the tines of a standard kitchen for transporting the rack independently.

27 Claims, 12 Drawing Sheets

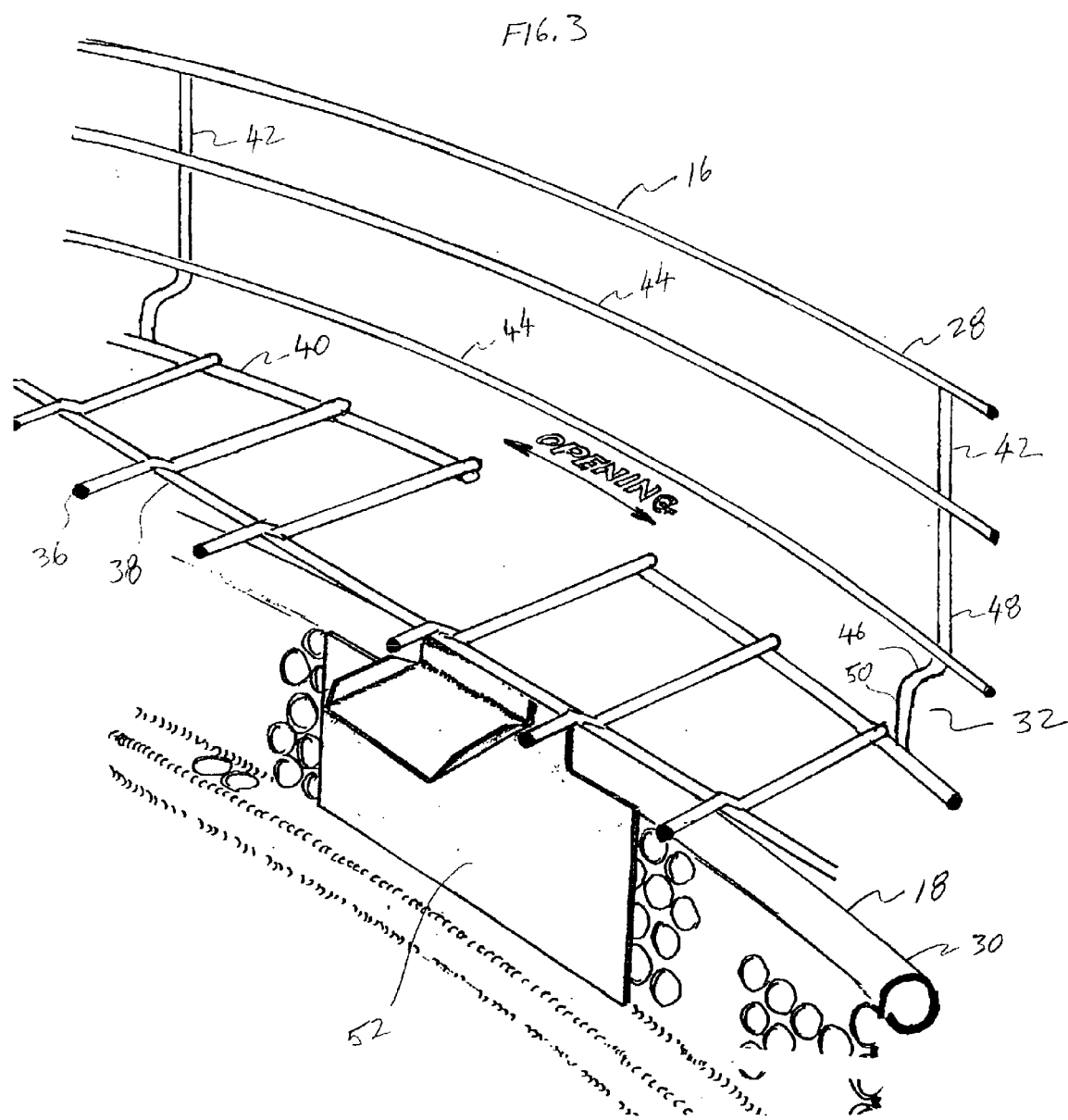

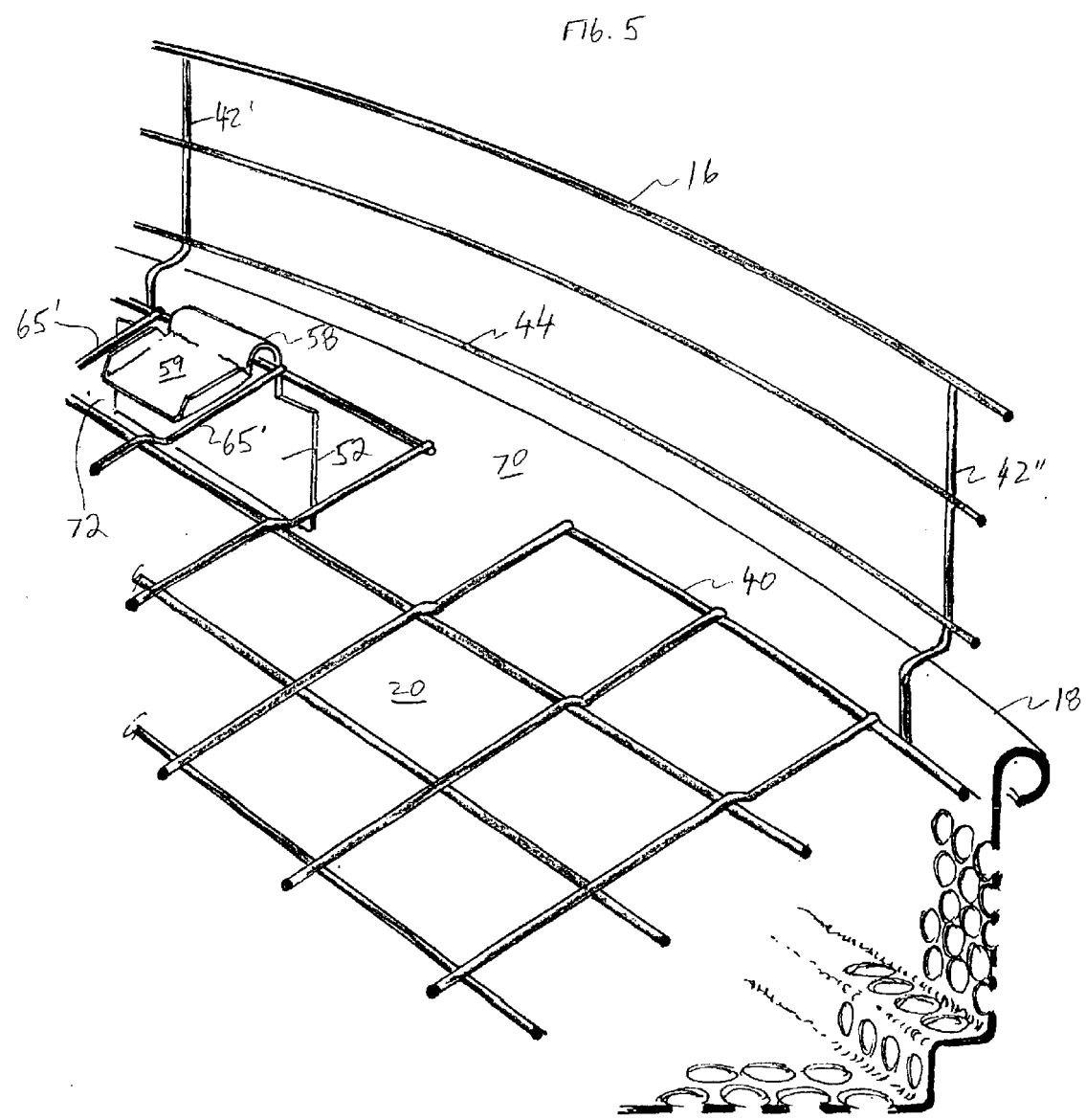

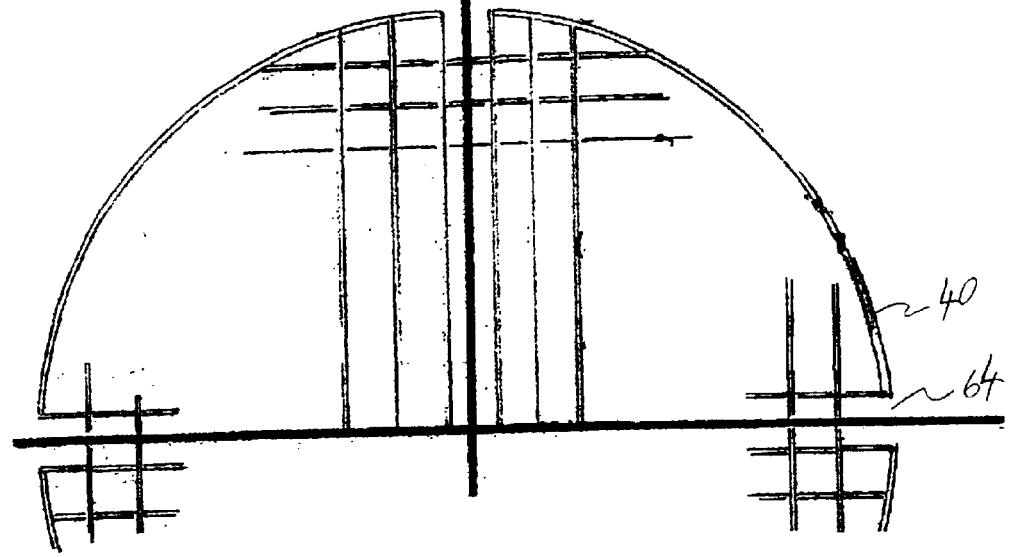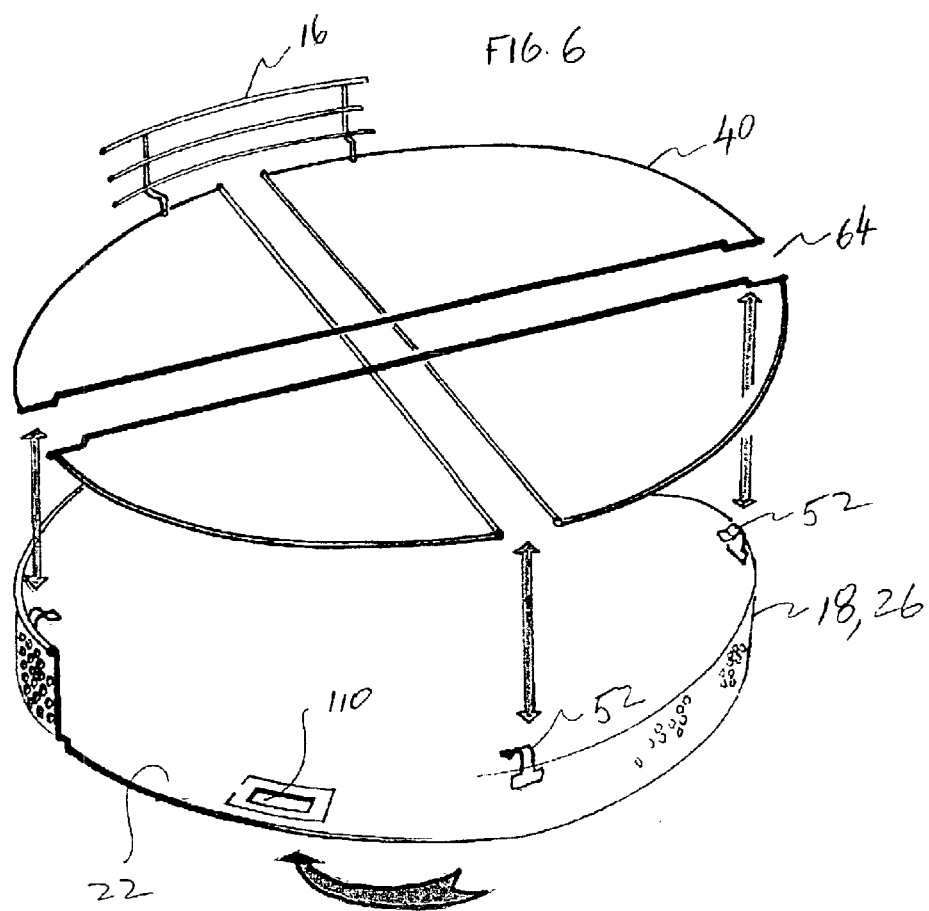

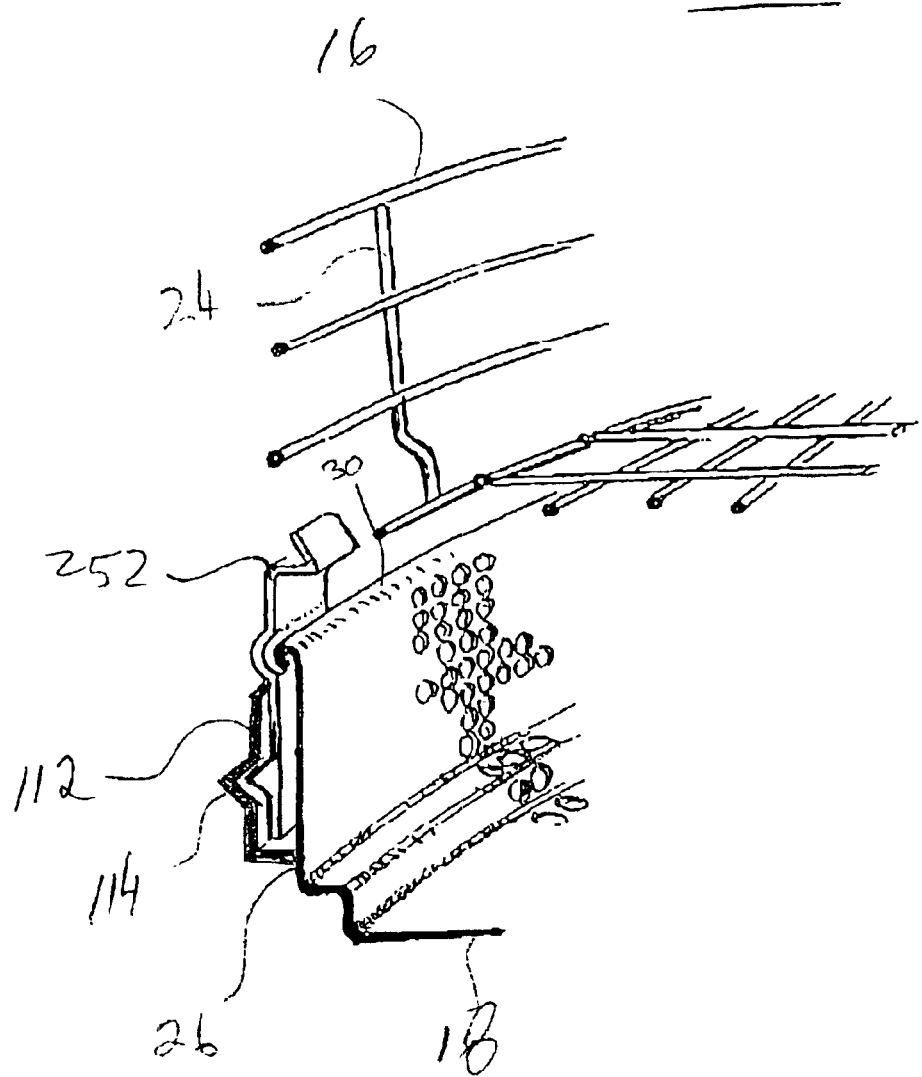

US 6,796,222 B2

COOKING APPLIANCE WITH INTERCONNECTING RACKS

FIELD OF THE INVENTION

The invention pertains to the field of cooking appliances, and in particular to cooking appliances having multiple racks which stack within a cooking vessel.

BACKGROUND AND SUMMARY OF THE INVENTION

To increase the surface area available for cooking, cooking appliances sometimes include a number of cooking racks that can be stacked together, vertically, within a cooking vessel to increase the amount of food items that may be put into a cooking appliance of a given width or "footprint."

While known multiple cooking racks provide certain benefits, they also increase the number of cooking components that the user must manage during a cooking session. To stack such racks in a cooking vessel, the user may first place the lower rack in the cooking vessel and then carefully place the upper rack on the lower rack, making sure that the two racks are aligned. Alternatively, the user can stack the two racks prior to placing them in the vessel, and then lower the stack of racks into the vessel while grasping both racks to ensure that they remain stacked together. These methods can be difficult and uncomfortable, especially if the vessel or surround area is hot.

Likewise, to remove stacked cooking racks, the user may have to grasp the upper rack, remove it from the cooking vessel and place the upper rack on an alternate support surface (e.g., a counter-top or table). Then, in a second step, the user may have to remove the lower rack and place it on the alternate support surface. Alternatively, the user may be able to grasp the lower rack first and remove the stack in one step, however this is often difficult or not possible.

When the racks are removed separately, it is also often difficult or not possible for the user to re-stack the racks on the alternate support surface (especially if the racks are hot) so the user is required to place the lower rack at a different location on the alternate support surface thereby occupying additional working area of the support surface.

To move a cooking rack, it is often desirable to use a utensil rather than one's hand to avoid a burn. However, prior types of cooking racks either require a special, dedicated utensil that serves no other purpose and may be difficult to replace if lost, or, if they permit the use of a standard kitchen utensil, do not provide sufficient stability.

The present invention overcomes the drawbacks of prior cooking devices by providing a cooking appliance having a vessel which contains multiple, stacking racks which may be quickly and conveniently connected and disconnected by the user thereby enabling the user to handle the stack of racks as one unit for inserting and removing the racks from the vessel. Further, a user can use a standard fork utensil to move the racks in a convenient and stable manner.

In one embodiment, the cooking appliance of the present invention includes multiple locking clips disposed around a circular periphery of a lower rack. An upper rack includes openings to receive the locking clips of the lower rack. The racks are interconnected by stacking the racks together and rotating the racks relative to one another in a quick and convenient manner. Specifically, to interconnect the racks, the racks are stacked together with the openings in the upper rack aligned with the locking clips of the lower rack. Then, the racks are rotated relative to one another to engage the lock. When the racks rotate through a predetermined arc relative to one another, the racks will interconnect such that the lower rack can be lifted by and suspended from the upper rack. In addition, when the lock is engaged and lower rack is suspended by the upper rack, the locking clips drop below a plane of the top of the food item support surface of the upper rack thereby preventing unintended rotation of the racks when the racks are moved by the user.

In addition, the food item support surface of one or both of the racks includes rectangular slots sized to closely receive the tines of a standard kitchen fork, which may be used to lift and transport the rack.

BRIEF DESCRIPTION OF THE DRAWINGS

For a complete understanding of the above and other features of the invention, reference shall be made to the following detailed description of the preferred embodiments of the invention and to the accompanying drawings, wherein:

FIG. 3 is a view of a first embodiment of the invention shown in a disconnected state;

FIGS. 4 and 5 are views of the invention shown in connected states;

FIGS. 6 and 7 are schematic views of the invention;

FIG. 18 is a view of a fifth embodiment of the invention.

DETAILED DESCRIPTION OF THE INVENTION

Figure 2:
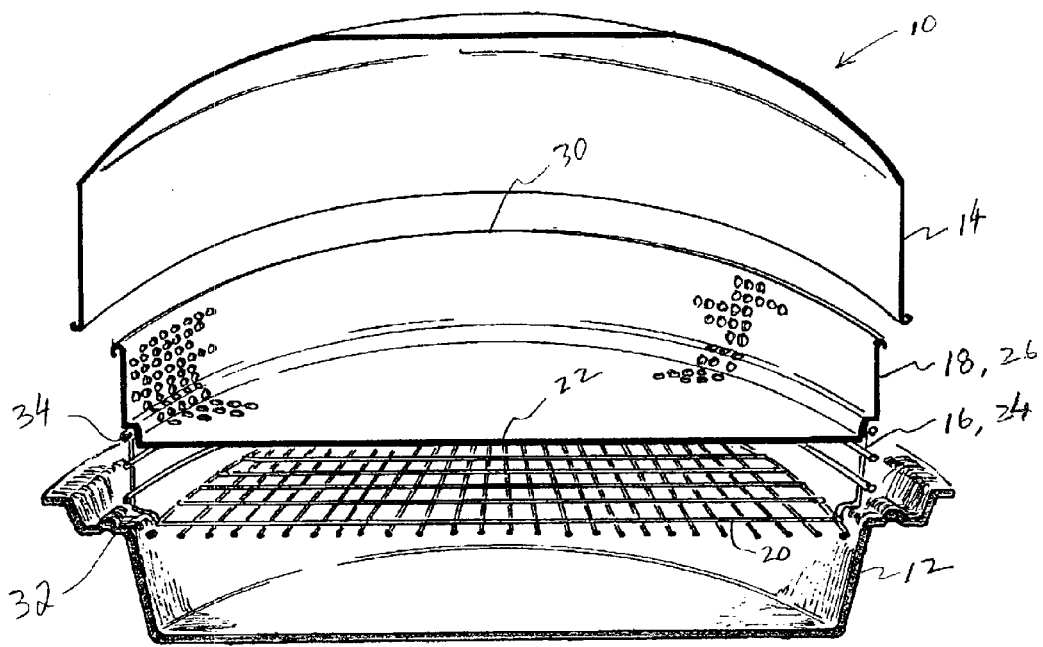
FIGS. 1 and 2 are sectional views of a cooking appliance constructed according to the invention.
Figure 1:
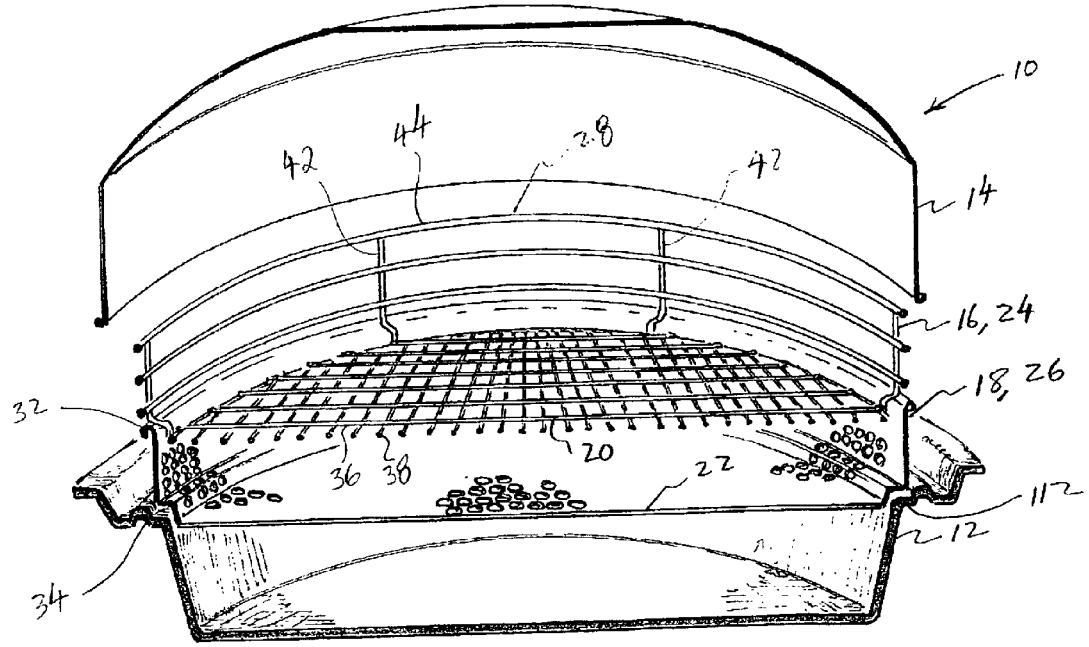

Referring to FIGS. 1, 2 & 3, a cooking appliance 10 constructed according to the invention includes a vessel 12, a top 14 and a number of racks 16, 18 that are sized and shaped to fit in the vessel 12 under the top 14 thereof.

The racks 16, 18 include a bottom 20, 22 forming a food item supporting surface and a peripheral side wall 24, 26 forming a rack support to support another rack a predetermined distance thereabove. As depicted, the racks are preferably substantially circular such that both the bottom 20, 22, the peripheral side wall 24, 26 and a top rim 28, 30 of the side wall 24, 26 are circular.

The bottom 20, 22 of each rack includes a circular peripheral recess 32, 34 sized and shaped to receive the rim 28, 30 of a lower rack to provide for partial nested stacking of the racks. Thus, when the racks are stacked, the stack has a substantial amount of lateral stability. In addition, the circular rim 28, 30 upon which the upper rack rests provides a pivotal support for the upper rack that, as is described in detail below, permits the rotation of the upper rack relative to the lower rack for interconnecting the two racks.

As shown, the racks can be of the wire mesh type, such as to upper rack 16, in which case the bottom 20 consists of the wires of the mesh. Alternatively, the racks can be of the perforated (steaming) type, such as the lower rack 18, or can be of other suitable types. The wire mesh rack 16 includes perpendicular longitudinal 36 and latitudinal 38 wires forming a wire mesh grid with voids (i.e., openings) between the wires. The grid is bounded by a circular peripheral boundary wire 40 forming a boundary of the grid. The side wall 24 of the wire mesh rack 16 includes a plurality of vertical support posts 42 disposed at predetermined intervals around a periphery of the bottom 20 of the rack 16. Preferably, the support posts 42 are affixed to and extend upwardly from the peripheral boundary wire 40. The side wall 24 also includes a plurality of circular horizontal retaining wires 44 affixed to the vertical support posts and disposed at predetermined heights above the bottom 20 of the rack 14.

Preferably, the vertical support posts 42 of the wire mesh rack 16 each include a substantially horizontal, radially-aligned portion 46 intermediate vertically-aligned upper and lower portions 48, 50, which in combination form the circular peripheral recess 32 sized and shaped to receive the rim 30 of a lower rack to provide for partial nested stacking and lateral stability of the racks. In addition to providing for partial nested stacking and lateral stability of the racks, the circular peripheral recess 32 provides for stable, relative rotation of the racks 16, 18 when in a stacked state.

Referring to FIGS. 3 through 7, in one embodiment, a lower rack 16 includes a plurality of attachment clips 52 connected to the side wall 26 for interconnecting the upper and lower racks 18, 16. The attachment clips 52 are preferably disposed at regular angular intervals (e.g., 90 or 180 degrees) around the side wall 26. The attachment clip 52 includes a base 54 affixed to an inside surface 56 of the side wall 26, a downwardly-facing, U-shaped neck portion 58 depending from the base 54 and a radially-inwardly, horizontal projecting end portion 59 depending from the neck portion 58. Preferably, the attachment clip 52 also includes opposed flange portions 60, 62 extending laterally (i.e., tangentially) outwardly and upwardly from the end potion 59 thereof.

The attachment clips 52 can be connected to the rack 18 in any suitable manner including welding, riveting or via fasteners or the like. Alternatively, the attachment clips 52 could be integrally formed with the rack 18.

The peripheral boundary wire 40 includes a plurality of gaps 64 disposed along the periphery of the rack. Preferably, the gaps 64 are disposed at the same regular angular interval as the attachment clips 52 (e.g., 90 or 180 degrees). Also, as shown in FIG. 7, the gaps 64 are preferably centered on lines of symmetry of the wire mesh grid. Each gap 64 joins a partially bounded void 66 in the wire mesh grid with a slot 68 in the side wall 24 of the rack forming an opening 70 to receive the attachment clip 52 of the lower rack 18. As shown, the partially bounded void 66 in the wire mesh grid is bounded by first and second parallel wires 65 and a single perpendicular wire 67, and the slot 68 in the side wall 24 of the rack 16 is bounded by the peripheral boundary wire 40, two vertical support posts 42', 42" and a lowest horizontal retaining wire 44'.

The opening 70 in the upper rack 16 is sized and shaped to receive the attachment clip 52 when the upper rack 16 is placed upon and supported by the lower rack 18 and to permit the upper rack 16 to rest upon the rim 30 of the lower rack 18. The slot 68 in the side wall 24 of the upper rack 18 is sized and shaped to permit the upper rack 16 to rotate relative to the lower rack 18 (or vice versa) to interconnect the two racks.

Preferably, the peripheral boundary wire 40 is spaced radially inwardly from the side wall 26 of the lower rack 18 to provide clearance for the neck portion 58 of the attachment clip 52. Also, when the upper rack 16 is resting on and supported by the lower rack 18, the neck portion 58 of the attachment clip 52 does not contact the peripheral boundary wire 40 or any other portion of the upper rack 16. Thus, when the upper rack 16 is stacked upon and supported by the lower rack 18, the racks can rotate relative to one another through a predetermined angular arc without interference by the attachment clip 52.

Figure 4:
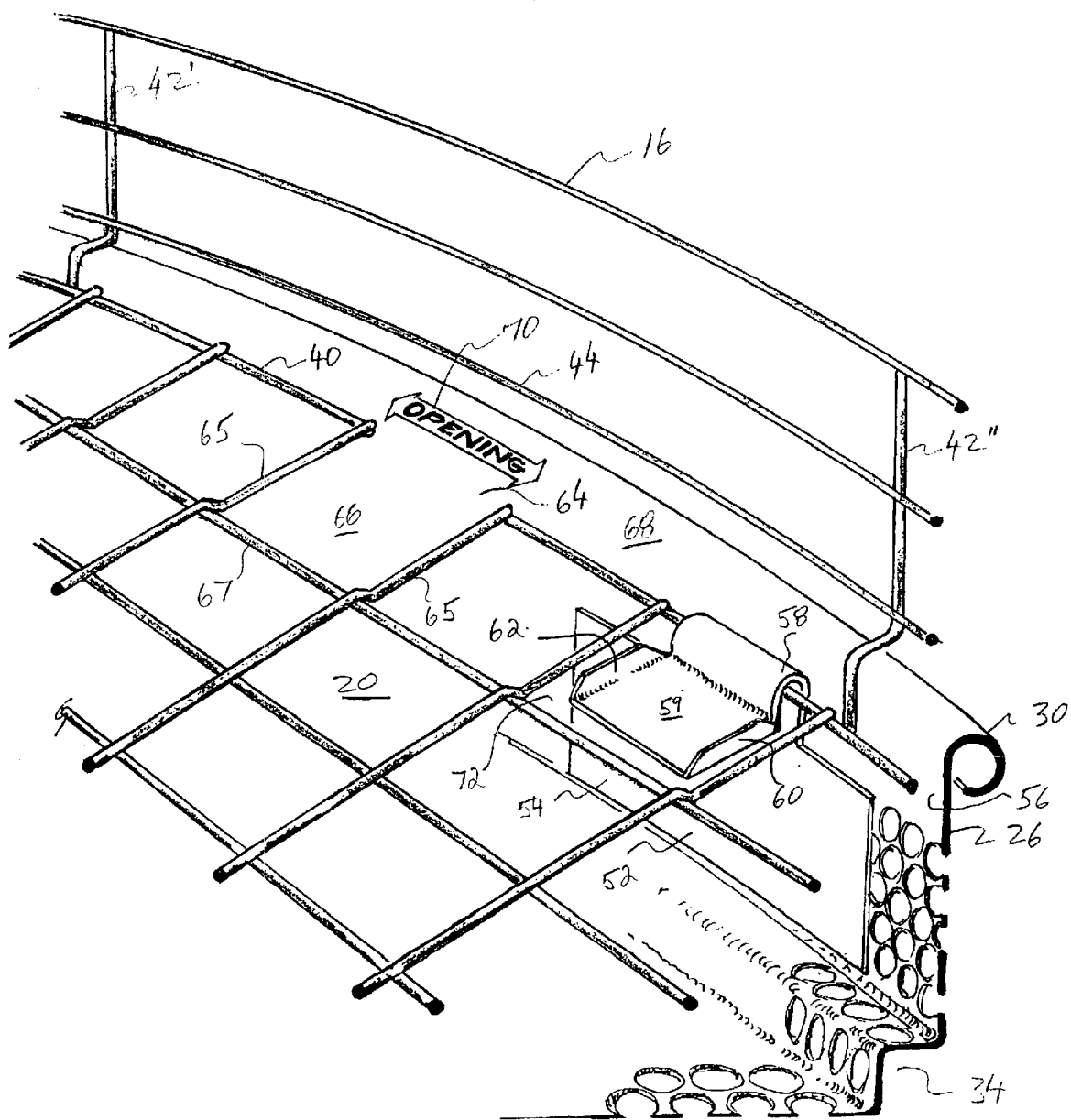
Figure 8:
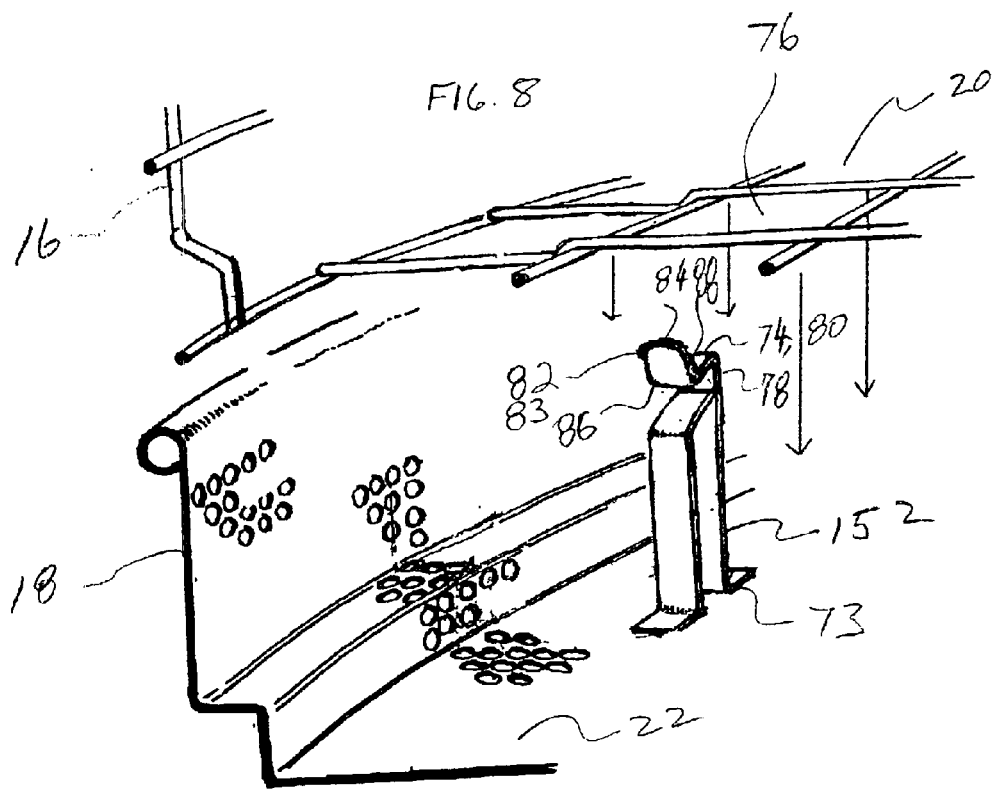
FIGS. 8, 9, 10, 11 & 12 are views of a second embodiment of the invention.
Figure 9:
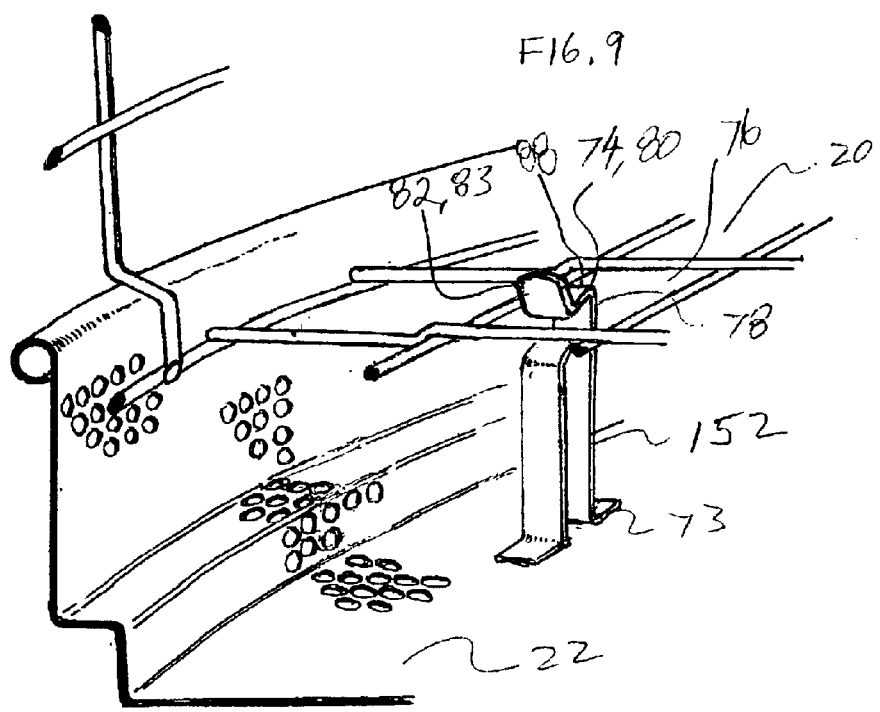
Figure 10:
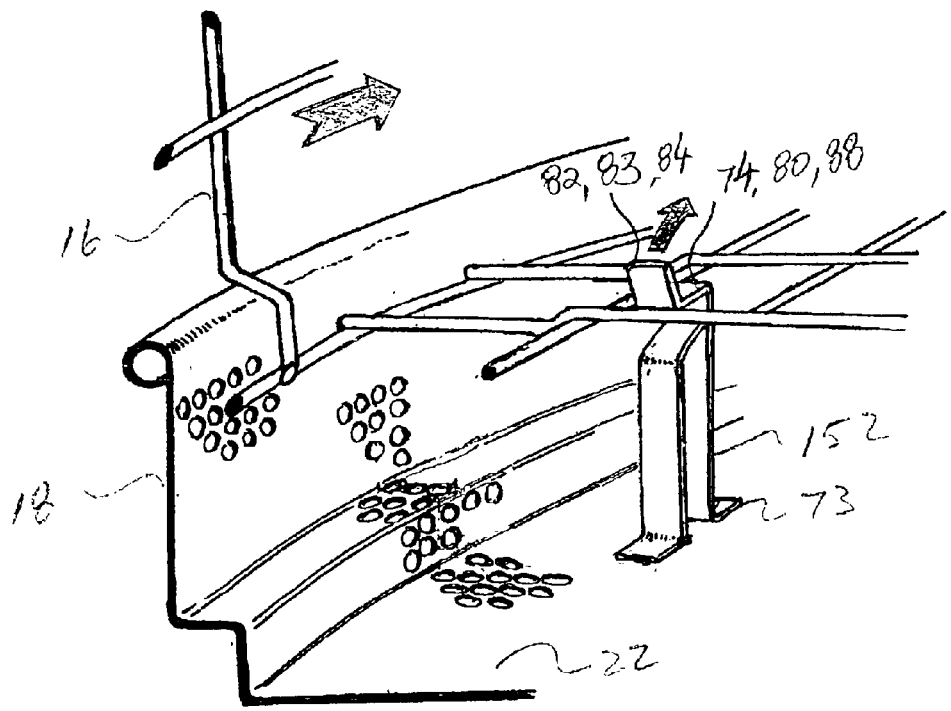
Figure 11:
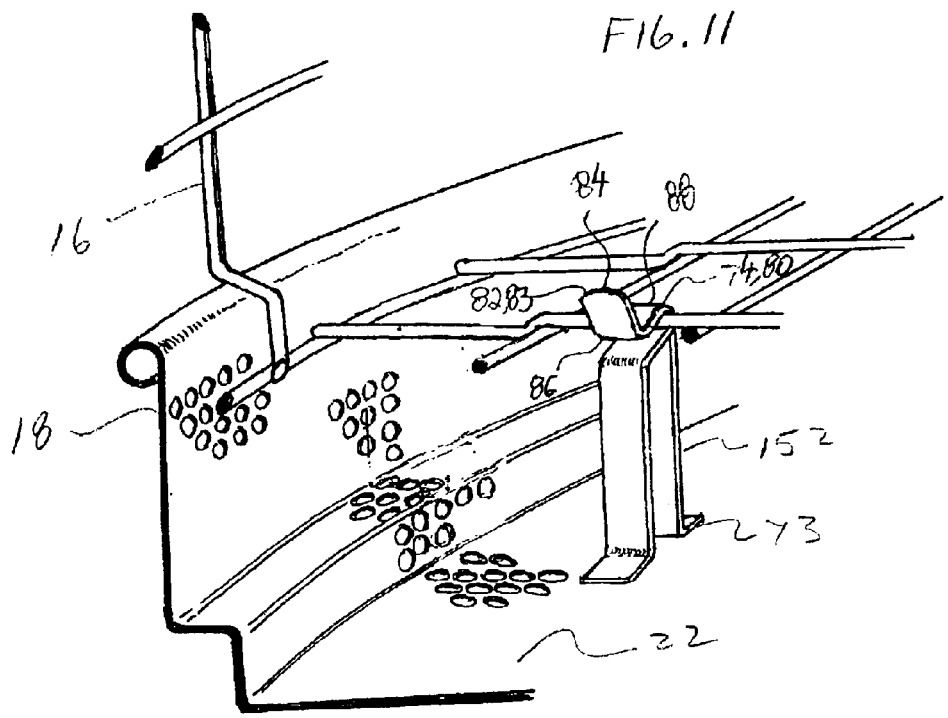

In a stacked, disconnected state, the attachment clip 52 is aligned with and located within the opening 70 of the upper rack 16. To interconnect the upper and lower racks 16, 18, the racks are rotated relative to one another such that the attachment clip 52 is angularly displaced from the opening 70. The degree to which the upper and lower racks 16, 18 rotate relative to one another depends on the angular arc of the slot 68 in the side wall 24 of the upper rack 16, which slot is bounded by the vertical support posts 42' and 42". As depicted in FIGS. 4 and 5, preferably, the racks 16, 18 can be interconnected by rotating them relative to one another in either direction.

In a connected state, the attachment clip 52, and in particular, the end portion 59 thereof, extends over the bottom 20 of the upper rack 16 such that the bottom 20 of the upper rack 16 is disposed between the attachment clip 52 and the bottom 24 of the lower rack 18. Thus, when the upper rack 16 is lifted by a user, the attachment clip 52 will engage the bottom 20 of the upper rack 16 and the bottom rack 18 will be suspended from the upper rack 16. In particular, the bottom rack 18 will be suspended via the neck portion 58 of the attachment clip 52.

Preferably, when in a suspended state, the end portion 59 of the attachment clip 52 is located below a top surface of the bottom 20 of the upper rack 16 to prevent unintended relative rotation of the racks. In particular, the U-shaped neck portion 58 of the attachment clip 52 extends upwardly a distance sufficient to permit the end portion 59 of the attachment clip 52 to extend into a recess or opening 72 in the wire mesh grid of the upper rack 16. In this position, the end portion 59 of the attachment clip 52 is located below a top plane of the wire mesh grid, and in particular, below the tops of adjacent parallel wires 65'. Thus, when in a suspended state, relative rotation between the upper and lower 16, 18 racks is substantially prevented.

Thus, to initially interconnect the two racks 16, 18, the openings 70 in the upper rack 16 are aligned with the attachment clips 52 of the lower rack 18 (FIG. 3) and the upper rack 16 is placed upon the lower rack 18. Then, to interconnect the racks, the two racks are rotated relative to one another (usually by rotating the upper rack 16) in either direction (FIG. 4 or 5) such that the attachment clips 52 are located above the bottom 20 of upper rack 16. At this point, the stack of racks are interconnected and the stack can be handled as one unit by simply handling (e.g., grasping and lifting) the upper rack 16. When the lower rack 18 is suspended by the upper rack 16, the attachment clips 52 prevent unintended rotation (and thus possible disconnection) of the racks. The racks are disconnected in a reverse manner.

As can be appreciated, the attachment clips 52 do not inhibit the ability of the racks 16, 18 to be swapped such that the rack 18 with the attachment clips 52 is on top (as depicted in FIG. 2). In this configuration, the racks 16, 18 are stacked in a partially nested manner as described above.

Referring to FIGS. 8 through 12, in a second embodiment of the invention, a plurality of attachment clips 152 are affixed to the bottom 22 of the lower rack 18, spaced radially inwardly from the side wall 26 of the lower rack 18 and disposed a regular angular positions about the bottom 22.

Figure 12:
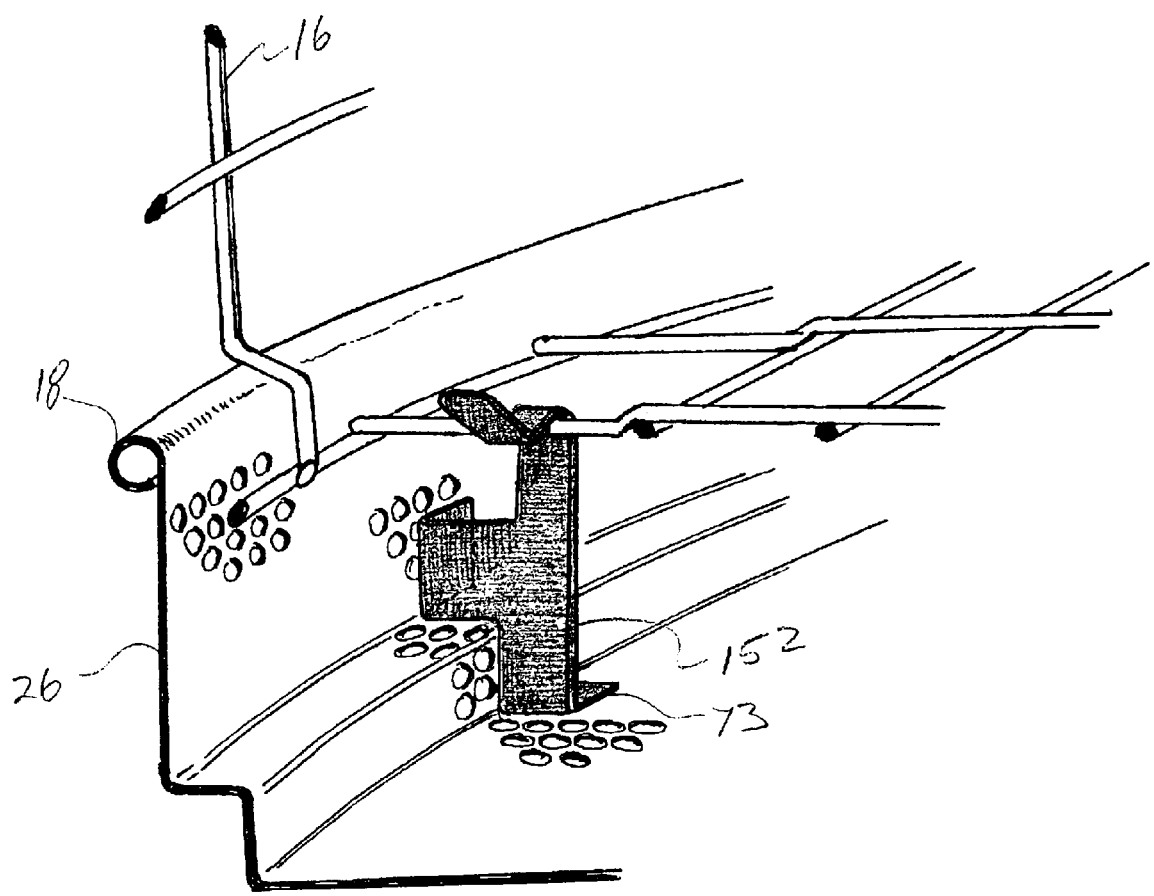

Each attachment clip 152 includes a base 73 and rack engaging portion 74 disposed a predetermined height above the bottom 22 of the lower rack 18. Each attachment clip 152 is located on the bottom 22 of the lower rack 18 at a position such that when the upper rack 16 is stacked upon the lower rack 18, the attachment clip 152 is aligned with an opening 76 in the bottom of the upper rack 16 (for example a void in the wire mesh grid). Further, the rack engaging portion 74 is sized and shaped to be received within the opening 76 in the bottom 20 of the upper rack 16 and extends through such opening 76 when the racks are in a stacked, supported state. As depicted in FIG. 12, the attachment clip 152 can also be affixed to the side wall 26 for further stability.

Each rack engaging portion 74 includes a stop 78 and a tangentially-extending portion 80 projecting from the stop 78. Preferably, the tangentially-extending portions 80 of the attachment clips 152 project in the same tangential direction (i.e., all project either clockwise or counter-clockwise as viewed from above).

To interconnect the racks, the upper rack 16 is placed upon (i.e., nested with) the lower rack 18, with the attachment clips 152 extending through aligned openings 76 in the bottom 20 of the upper rack 16. Then, the racks are rotated relative to one another such that the bottom 20 of the upper rack 16 is located between the tangentially-extending portions 80 and the bottom 22 of the lower rack. Preferably, the racks are rotated until the bottom 20 of the upper rack 16 contacts the stops 78 of the attachment clips 152. At this point the racks are interconnected and the lower rack 18 can be lifted by and suspended from the upper rack 16 for handling the stack as one unit.

Preferably, the tangentially-extending portion 80 resiliently depends from the base 73 of the attachment clip 152 and is biased in an at-rest position. A guide 82 projects upwardly from the tangentially-extending portion 80. When the racks are in a stacked state, a free end portion 84 of the guide 82 is located above a plane of the bottom 20 of the upper rack 16. In the stacked state, an intermediate portion 86 of the tangentially-extending portion 82 is disposed below the plane of the bottom 20 of the upper rack 16, when the tangentially-extending portion 80 is in the at-rest state. An inner portion 88 of the tangentially-extending portion 80, located between the intermediate portion 86 and the stop 78 is disposed above the intermediate portion 86.

When the racks 16, 18 are rotated relative to one another, and sufficient torque is applied to the racks, the guide 83 urges the intermediate portion 86 over the bottom 20 of the upper rack 16 (i.e., a wire of the wire mesh grid) against the resilient bias of the attachment clip 152. When the intermediate portion 86 passes over the bottom 20 of the upper rack 16 such that the a portion of the bottom 20 (i.e., a wire) is located between the intermediate portion 86 and the stop 78, the bias of the attachment clip 152 tends to return the tangentially-extending portion 80 to the at-rest position. As can be appreciated, in this state, the racks are releasably locked together.

To disconnect the racks 16, 18, sufficient torque is applied in the opposite direction to overcome the bias of the attachment clip 152 and the operation is reversed. Preferably, the guide 83 extends above the bottom 20 of the upper rack 16 a sufficient distance to permit articulation of the tangentially-extending portion 80 upwardly from the at-rest position by a user so that the user can more easily connect and disconnect the racks.

In a connected state, the bottom 20 of the upper rack 16 is located between the tangentially-extending portion of the rack engaging portion 74 of the attachment clip 52 and the bottom 22 of the lower rack 18.

Figure 13:
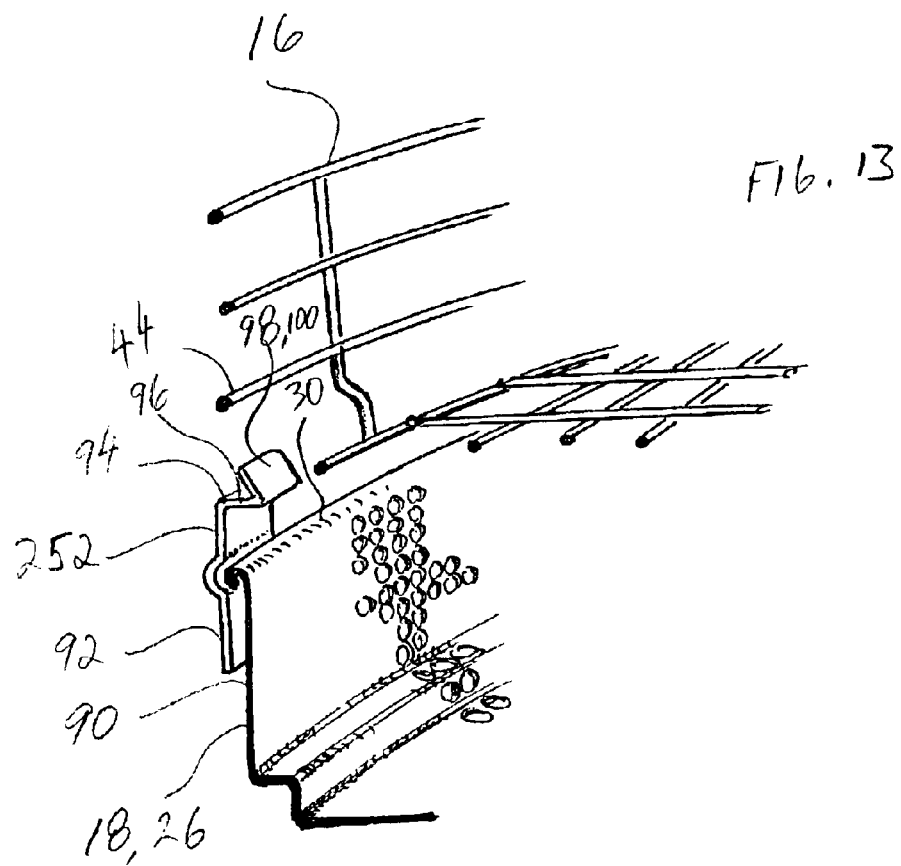
FIGS. 13, 14 & 15 are views of a third embodiment of the invention.
Figure 14:
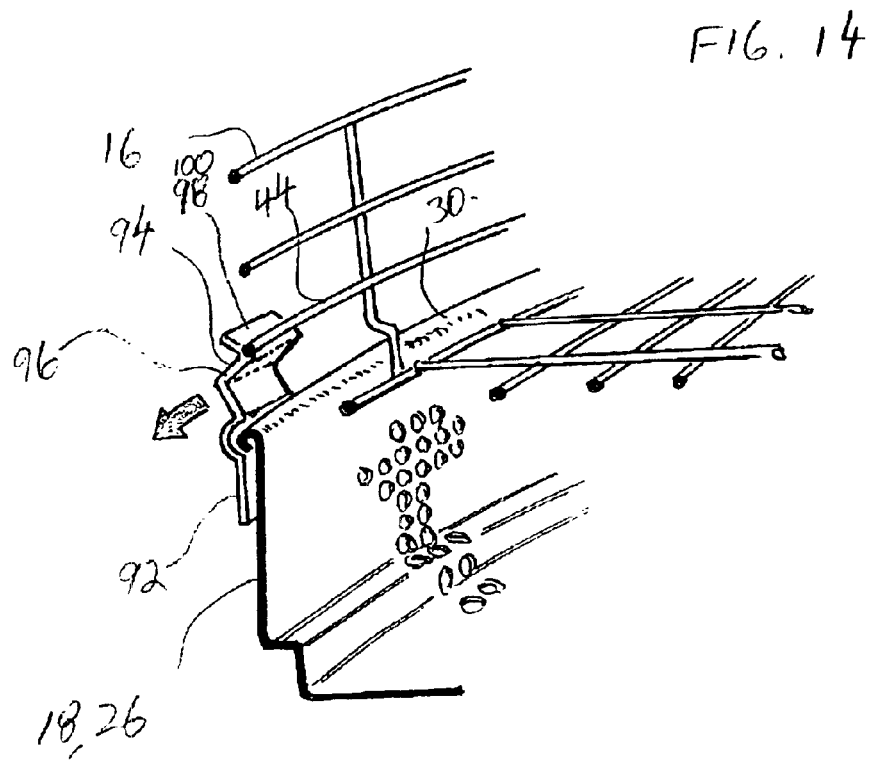
Figure 15:
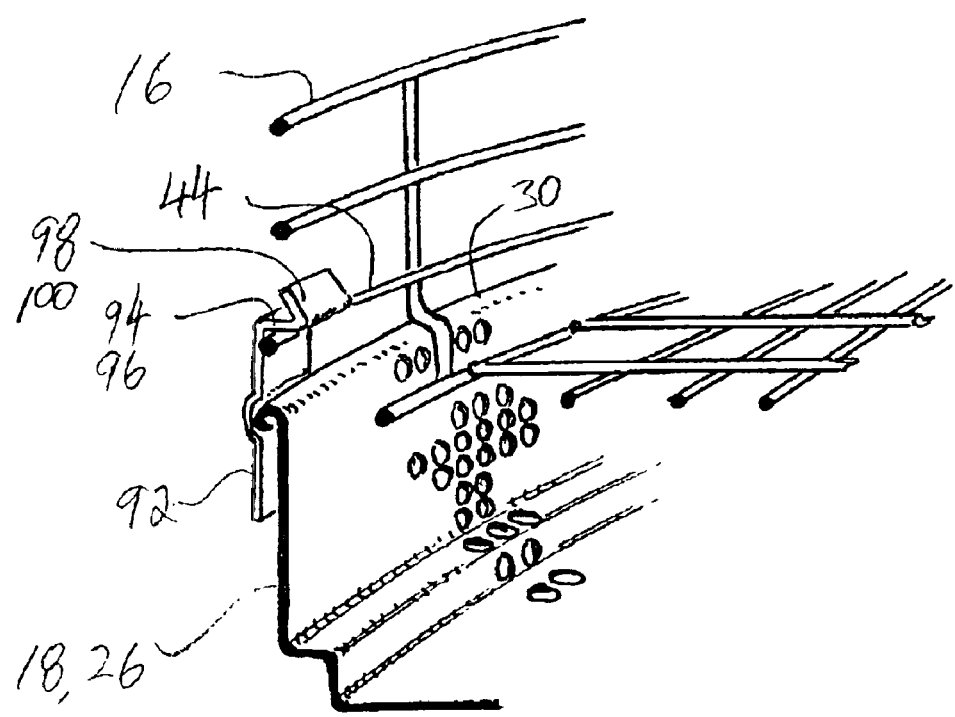

Referring to FIGS. 13 through 15, in a third embodiment of the invention, a plurality of attachment clips 252 are affixed to an outside surface 90 of the side wall 26 of the lower rack 18, in a cantilevered fashion preferably at regular angular intervals along the periphery of the lower rack 18. Each attachment clip 252 includes a base 92 affixed to the lower rack 18 and rack engaging portion 94 resiliently depending from the base 92. The rack engaging portion 94 is disposed a predetermined height above the rim 30 of the lower rack 18 and, in a connected state, releasably securely engages a portion of the side wall 24 of the upper rack 16. Specifically, the rack engaging portion 94 securely engages a top surface of one of the circular retaining wires 44 forming the side wall 24 of the upper rack 16.

The rack engaging portion 94 of the attachment clip 252 includes a radially inwardly projection portion 96 which, in a connected state, is in contact with a top surface of a retaining wire 44 forming the side wall 24 of the upper rack 16. Thus, in the connected state, the retaining wire 44 is located between the rack engaging portion 94 (specifically, the radially inwardly projection portion 96 thereof) and the rim 30 of the bottom rack 18. Therefore, in the connected state, the lower rack 18 is securely connected to the upper rack 16 and the stack of racks can be handled as one unit.

Preferably, the attachment clip 252 includes a radially outwardly extending portion 98 having a free end portion 100 disposed radially outwardly from the outside surface 90 of the side wall 26 of the lower rack 18 to permit the user to deflect the attachment clip 252 outwardly from an at-rest position.

To connect the racks 16, 18, the upper rack 16 is aligned above and place upon the lower rack 18 as discussed above, and each attachment clips 252 is (sequentially) deflected by the user via the radially outwardly extending portion 98 to engage the rack engaging portion 94 with the upper rack 16. The racks are disconnected in a reverse manner.

Figure 17:
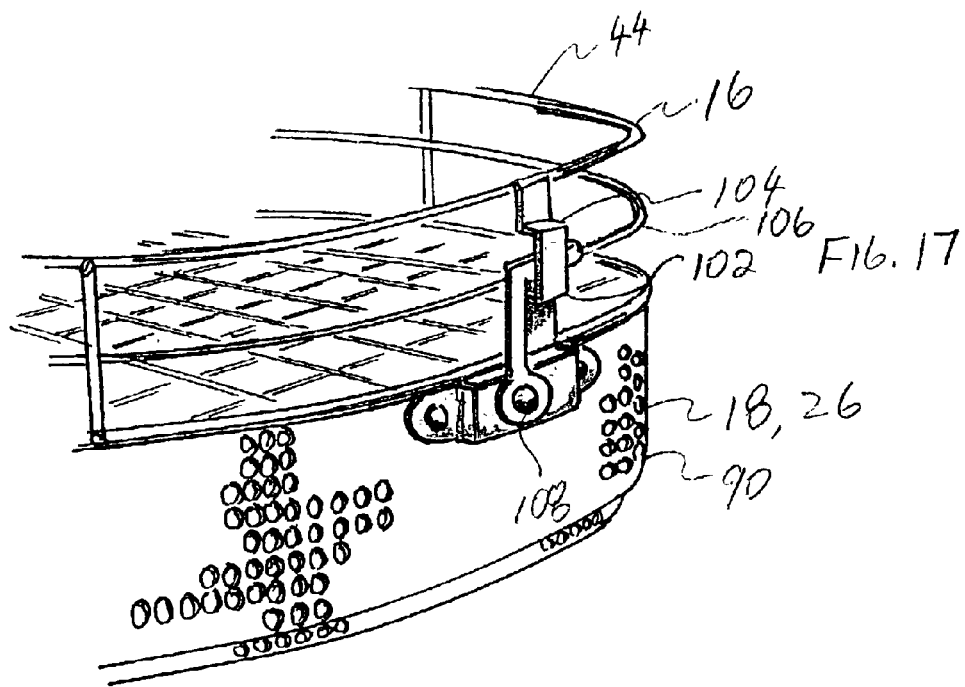
FIGS. 16 & 17 are views of a fourth embodiment of the invention.
Figure 16:
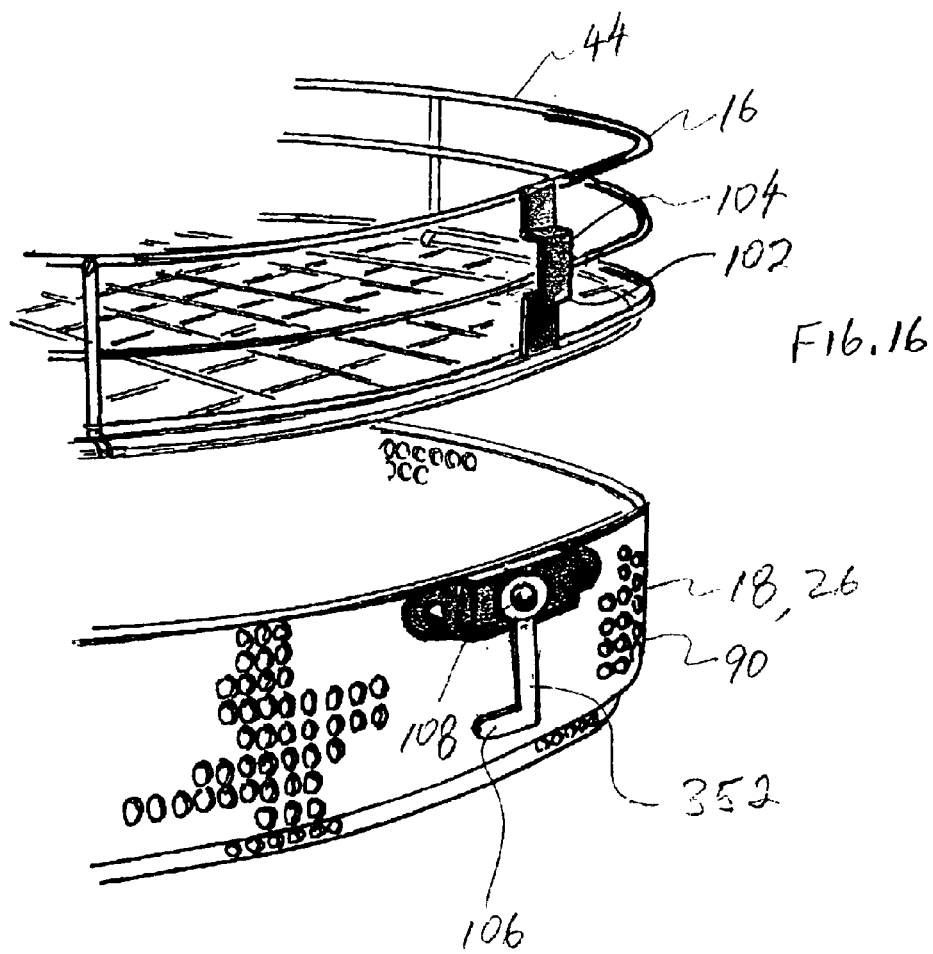

Referring to FIGS. 16 and 17, in a fourth embodiment, the lower rack 18 includes a plurality of preferably L-shaped attachment clips 352 pivotally connected to the outside surface 90 of the side wall 26 of the lower rack 18. The attachment clips 352 are preferably disposed at regular angular intervals around the periphery of the lower rack 18. Also, preferably each attachment clip 352 pivots in a plane substantially parallel (or tangential) to the side wall 26 of the lower rack 18. The upper rack 16 includes a plurality of attachment clip abutment surfaces 102 integrally formed with and/or extending radially outwardly from the side wall 24 of the upper rack 16. To ensure proper alignment with the attachment clips 352, the abutment surfaces 102 are preferably disposed at the same regular angular intervals as the attachment clips 352. As depicted, each abutment surface 102 can comprise a channel 104 affixed to the retaining wires 44 of the upper rack 16 where the channel has an opening 105 shaped and sized to receive the attachment clip 352 to at least partially surround the attachment clip 352.

In a connected state, an end portion 106 of the attachment clip 352 is in contact with or in close proximity to an associated abutment surface 102, with the abutment surface 102 located between the end portion 106 and the pivotal connection 108 of the attachment clip 352. Thus, the lower rack 18 can be lifted by and suspended from the upper rack 16 such that the stack of racks can be handled as one unit.

To connect the racks 16, 18, the racks are stacked as discussed above, with the attachment clips 352 aligned with associated abutment surfaces 102. Then the attachment clips 352 are rotated by the user such that the end portions 106 thereof are in contact with (or in close proximity to) the abutment surfaces 102, with the abutment surfaces 102 between the end portions 106 and the associated pivotal connection 108. As can be appreciated, the racks 16, 18 are disconnected in an opposite manner.

Referring again to FIG. 6, a rack, such as the lower rack 18, can include at least one utensil receiving opening 110 in the bottom surface 22 thereof, which is sized and shaped to closely receive an end of a standard utensil, such a standard kitchen fork, for transporting the lower rack 18 independently of another rack.

Preferably, the utensil receiving 110 opening is substantially rectangular in shape and is sized to closely receive the tines of a standard kitchen fork. The utensil receiving opening 110 is located adjacent the side wall 26 of the lower rack 18, preferably about ¼ inches therefrom, and is preferably substantially rectangular in shape, with a longitudinal axis of about 1¼ inches aligned substantially parallel to the adjacent side wall 26 of the rack 18, and with and a lateral axis of about ¼ inches.

The rack 18 is intended to be used in conjunction with and placed within the vessel 12. Therefore, the utensil receiving opening 110 is preferably spaced radially inwardly from the side wall 26 a distance sufficient to clear a supporting rim 112 of the vessel 12 upon which the rack 18 rests when placed within the vessel (see also FIG. 1). In this manner, the supporting rim 112 of the vessel will not interfere with the insertion of the utensil into the opening 110 when the rack 18 is resting upon the vessel 12.

Also, preferably, the periphery of the opening 110 is reinforced with a periphery of reinforcing material (e.g., sheet metal) to provide substantial durability to the opening 110. Also, the opening 110 is preferably spaced a distance from any attachment clip, such as the attachment clip 52, such that the attachment clip 52 does not interfere with the use of the utensil receiving opening 110.

To transport the rack 18 with a standard kitchen fork, the tines of the fork (not shown) are directed through the opening 110 with the top of the fork directed away from the side wall 26 of the rack 18. Then, the fork is rotated toward the adjacent side wall 26 until the back of the fork contacts the side wall 26. At this point, the user may lift the rack 18 by applying sufficient lifting force (and moment) to the fork to overcome the weight of the rack 18. As can be appreciated, the utensil receiving opening 110 can be used to place the rack 18 into and remove the rack from the vessel 12 in a convenient manner.

Referring to FIG. 18, in a fifth embodiment, an attachment clip 452 can be removably attachable to either the lower 18 and upper 16 racks such that the same attachment clips 452 can be used to interconnect the racks in either configuration. That is, in the configuration depicted in FIG. 1 or FIG. 2. The attachment clip 452 can project upwardly from a side wall of one of the racks, such as the lower rack 18 in which position it can connect to a rack stacked thereabove. Alternatively, the attachment clip 452 can project upwardly from a side wall of the other rack such where it can connect with a rack stacked thereabove.

Each rack includes means to releasably connect the attachment clip 452 with the attachment clip projecting above the side wall (and rim) of the rack. As depicted this can be accomplished via a socket 112 on the outside surface of the sidewall 24 having a recess 114 sized and shaped to receive a projection 116 in the attachment clip 452. The recess 114 and projection 116 are sized to permit insertion and removal of the attachment clip from the socket 112 and to securely retain the attachment clip 452 when inserted. When inserted, the attachment clip 452 projects upwardly from the side wall 26 and rim 30 of the rack 18 for connection with the rack thereabove. As above, there are preferably a plurality of such sockets and attachment clips disposed at regular angular intervals around the periphery of the rack.

Preferably each rack includes such sockets such that the position of the sockets can be moved to permit interconnection of the racks in the desired configuration. Specifically, preferably the other rack (here rack 16) also includes the sockets 112 similar in configuration to that described above, which sockets could be attached to the side wall 24 of the rack 16. It can be appreciated that other releasable attachment clip configurations are also within the scope of the invention.

As can be appreciated the present invention provides significant advantages in cooking appliances having multiple, stacking racks within the cooking appliance. In particular, the invention provides a convenient means to insert, remove and otherwise handle multiple cooking racks as a single unit and to transport such cooking racks using readily accessible and replaceable standard utensils.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

What is claimed:

1. A cooking appliance comprising:
    a vessel;
    a first and second racks each having a food item support surface;
    said first rack having a rack support, suitable to support said second rack on top of said first rack with said food item support surface of said second rack spaced a predetermined distance above said food item support surface of said first rack; and
    suspension means to releasably suspend said first rack from said second rack such that the two racks can be handled as one unit, said suspension means extending directly from said first rack.

2. A cooking appliance as in claim 1, wherein said means to suspend said first rack from said second rack is in a disengaged state when said first and second racks are in a first angular orientation and is in an engaged state when said first and second racks are in a second angular orientation whereby said releasable suspension means is actuated by rotating said first and second racks relative to one another when said racks are arranged in a vertical stack.

3. A cooking appliance as in claim 2, wherein said releasable suspension means comprises means to prevent relative rotation of said first and second racks when said first rack is suspended from said second rack.

4. A cooking appliance as in claim 3, wherein said releasable suspension means comprises means to permit relative rotation of said first and second racks when said second rack is supported by said first rack.

5. A cooking appliance as in claim 1, wherein
    said first rack includes a plurality of attachment clips;
    said second rack includes a plurality of openings, each opening being sized and shaped to receive one of said attachment clips; and when said first and second racks are in a connected state, said food item support surface of said second rack is disposed between said attachment clips and said food support surface of said first rack.

6. A cooking appliance as in claim 5, wherein:

said openings are disposed on said food item support surface of said second rack;

said second rack includes a peripheral side wall having a plurality of slots, each slot being in communication with one of said openings;

said clips extending through said slots when said second rack is supported by said first rack; and said slots being sized to permit relative rotation of said first and second racks when said second rack is supported by said first rack.

7. A cooking appliance as in claim 6 further comprising means to prevent relative rotation of said first and second racks when said first rack is suspended from said second rack.

8. A cooking appliance as in claim 7, wherein, when said first rack is suspended from said second rack, a portion of said second rack is disposed between each of said attachment clips and said openings to prevent relative rotation of said first and second racks.

9. A cooking appliance as in claim 5, wherein:

each said attachment clip is affixed to said food item supporting surface of said first rack, and includes a rack engaging portion;

when in a connected state, said engaging portion of said attachment clip contacts a top surface of said food item support surface of said second rack; and said attachment clip being operable to prevent relative rotation of said first and second racks when ins a connected state.

10. A cooking appliance as in claim 9, wherein:

a guide extends upwardly from said rack engaging portion; and said top surface of said food item support surface of said second rack includes an attachment clip engaging portion; and during interconnection of said first and second racks via relative rotation of said first and second racks, said guide being operable to direct said rack engaging portion of said attachment clip over said attachment clip engaging portion of said second rack.

11. A cooking appliance as in claim 10, wherein said guide extends above said food item support surface of said second rack a sufficient distance to permit articulation of said attachment clip by a user for disengagement of said attachment clip and disconnection of said first and second rack.

12. A cooking appliance as in claim 1, wherein:

said first rack includes a plurality of attachment clips disposed on a periphery of said first rack;

in a connected state, each said attachment clip engaging a periphery of said second rack.

13. A cooking appliance as in claim 12, wherein:

each of said attachment clips resiliently depends from said periphery of said first rack and includes a rack engaging portion and a guide depending from said rack engaging portion;

said second rack includes a plurality of attachment clip engaging portions; and said guide being operable to direct said rack engaging portion of said attachment clip over an associated attachment clip engaging portion of said second rack during interconnection of said first and second racks.

14. A cooking appliance as in claim 13, wherein said guide extends outwardly from said periphery of said second rack a sufficient distance to permit articulation of said attachment clip by a user for disengagement of said attachment clip and disconnection of said first and second rack.

15. A cooking appliance as in claim 12, wherein:

each of said attachment clips is pivotally connected to said periphery of said first rack; and said periphery of said second rack in includes a plurality of recesses sized and shaped to receive one of said attachment clips.

16. A cooking appliance comprising:

a vessel;

first and second racks each having a food item support surface;

said first rack having a rack support suitable to support said second rack on top of said first rack with said food item support surface of said second rack spaced a predetermined distance above said food item support surface of said first rack;

means to releasably interconnect said first and second racks such that the two racks can be handled as one unit;

said first rack includes a plurality of attachment clips;

said second rack includes a plurality of openings, each opening being sized and shaped to receive one of said attachment clips; and when said first and second racks are in a connected state, said food item support surface of said second rack is disposed between said attachment clips and said food support surface of said first rack.

17. A cooking appliance as in claim 16, wherein;

said openings are disposed on said food item support surface of said second rack;

said second rack includes a peripheral side wall having a plurality of slots, each slot being in communication with one of said openings;

said clips extending through said slots when said second rack is supported by said first rack; and said slots being sized to permit relative rotation of said first and second racks when said second rack is supported by said first rack.

18. A cooking appliance as in claim 17 further comprising means to prevent relative rotation of said first and second racks when said first rack is suspended from said second rack.

19. A cooking appliance as in claim 18, wherein, when said first rack is suspended form said second rack, a portion of said second rack is disposed between each of said attachment clips and said openings to prevent relative rotation of said first and second racks.

20. A cooking appliance as in claim 16, wherein:

each said attachment clip is affixed to said food item supporting surface of said first rack, and includes a rack engaging portion;

when in a connected state, said engaging portion of said attachment clip contacts a top surface of said food item support surface of said second rack; and said attachment clip being operable to prevent relative rotation of said first and second racks when in a connected state.

21. A cooking appliance as in claim 20, wherein:

a guide extends upwardly from said rack engaging portion; and said top surface of said food item support surface of said second rack includes an attachment clip engaging portion; and during interconnection of said first and second racks via relative rotation of said first and second racks, said guide being operable to direct said rack engaging protion of said attachment clip over said attachment clip engaging portion of said second rack.

22. A cooking appliance as in claim 21, wherein said guide extends above said food item support surface of said second rack a sufficient distance to permit articulation of said attachment clip by a user for disengagement of said attachment clip and disconnection of said first and second rack.

23. A cooking appliance comprising:

a vessel;

first and second racks each having a food item support surface;

said first rack having a rack support suitable to support said second rack on top of said first rack with said food item support surface of said second rack spaced a predetermined distance above said food item support surface of said first rack;

means to releasably interconnect said first and second racks such that the two racks can be handled as one unit;

said first rack includes a plurality of attachment clips disposed on a periphery of said first rack;

in a connected state, each said attachment clip engaging a periphery of said second rack.

24. A cooking appliance as in claim 23, wherein:

each of said attachment clips resiliently depends from said periphery of said first rack and includes a rack engaging portion and a guide depending from said rack engaging portion;

said second rack includes a plurality of attachment clip engaging portions; and said guide being operable to direct said rack engaging portion of said attachment clip over an associated attachment clip engaging portion of said second rack during interconnection of said first and second racks.

25. A cooking appliance as in claim 24, wherein said guide extends outwardly from said periphery of said second rack a sufficient distance to permit articulation of said attachment clip by a user for disengagement of said attachment clip and disconnection of said first and second rack.

26. A cooking appliance as in claim 23, wherein:

each of said attachment clips is pivotally connected to said periphery of said first rack; and said periphery of said second rack in includes a plurality of recesses sized and shaped to receive on of said attachment clips.

27. A method of lifting a cooking rack, comprising:

providing a cooking rack with a bottom surface;

providing a side wall disposed around and extending upwardly from said bottom surface and terminating at a peripheral rim;

providing a utensil receiving opening in said bottom surface, said opening being located adjacent a portion of said side wall;

said opening being substantially rectangular in shape and having a longitudinal axis aligned substantially parallel to said portion of said side wall adjacent thereto inserting a first end of a utensil into said utensil receiving opening, said utensil opening closely receiving said first end of said utensil, and said utensil contacting a bottom of said cooking rack;

said side wall contacting said peripheral rim of said side wall;

applying upward force on a second end of said utensil, said second end being located radially outwardly from said peripheral rim.

\* \* \* \* \*